(12) United States Patent
Knestrick et al.

(10) Patent No.: US 7,690,450 B2
(45) Date of Patent: Apr. 6, 2010

(54) SYSTEM FOR OPERATING A HYDRAULICALLY ACTUATED DEVICE

(75) Inventors: Nathan Knestrick, Toledo, OH (US); Wallace Smith, Petersburg, MI (US)

(73) Assignee: Parker-Hannifin Corporation, Cleveland, OH (US)

(*) Notice: Subject to any disclaimer, the term of this patent is extended or adjusted under 35 U.S.C. 154(b) by 209 days.

(21) Appl. No.: 11/713,227

(22) Filed: Mar. 2, 2007

(65) Prior Publication Data

US 2008/0060857 A1 Mar. 13, 2008

Related U.S. Application Data

(60) Provisional application No. 60/844,046, filed on Sep. 12, 2006.

(51) Int. Cl.
*B60K 17/28* (2006.01)
*B60K 25/00* (2006.01)

(52) U.S. Cl. ................................ 180/53.4; 180/165

(58) Field of Classification Search ............ 60/417, 60/418, 448; 180/53.4, 53.6, 53.8, 165
See application file for complete search history.

(56) References Cited

U.S. PATENT DOCUMENTS

| | | | |
|---|---|---|---|
| 3,700,060 A | 10/1972 | Keene et al. | |
| 3,779,608 A * | 12/1973 | Hatcher et al. | 299/39.4 |
| 3,921,746 A * | 11/1975 | Lewus | 180/165 |
| 3,957,129 A | 5/1976 | Rau | |
| 3,964,260 A * | 6/1976 | Williams et al. | 60/413 |
| 4,093,034 A | 6/1978 | Curley et al. | |
| 4,189,021 A * | 2/1980 | Scheuerpflug et al. | 180/69.6 |
| 4,199,960 A | 4/1980 | Adams et al. | |
| 4,320,589 A | 3/1982 | Pelazza | |
| 4,341,282 A | 7/1982 | Bird | |
| 4,430,846 A | 2/1984 | Presley et al. | |
| 4,589,293 A * | 5/1986 | Mori | 74/15.6 |
| 4,651,846 A | 3/1987 | Headrick | |
| 4,778,020 A | 10/1988 | Hagin et al. | |
| 5,168,703 A * | 12/1992 | Tobias | 60/418 |
| 5,596,823 A | 1/1997 | Clasen et al. | |
| 5,775,102 A | 7/1998 | Frye et al. | |
| 5,794,734 A * | 8/1998 | Fahl et al. | 180/165 |
| 6,062,039 A | 5/2000 | Haramoto et al. | |
| 6,457,546 B1 * | 10/2002 | Ishimaru et al. | 180/305 |
| 7,104,478 B2 | 9/2006 | Niemela et al. | |

(Continued)

FOREIGN PATENT DOCUMENTS

EP 0047644 3/1982

(Continued)

*Primary Examiner*—Paul N Dickson
*Assistant Examiner*—Laura Freedman
(74) *Attorney, Agent, or Firm*—MacMilliam, Sobanski & Todd, LLC

(57) ABSTRACT

A system for operating a hydraulically actuated device that is provided on a vehicle includes a power take-off unit that is adapted to be driven by a vehicle and a hydraulic pump that is driven by the power take-off unit. The system also includes an accumulator and a hydraulically actuated device. Lastly, the system includes a controller that causes the hydraulic pump to supply pressurized fluid to the hydraulically actuated device when the vehicle is moving. When the vehicle is not moving, however, the controller causes the accumulator to supply pressurized fluid to the hydraulically actuated device.

14 Claims, 3 Drawing Sheets

U.S. PATENT DOCUMENTS

| | | |
|---|---|---|
| 7,140,457 B2 | 11/2006 | Ishimaru et al. |
| 2004/0118621 A1 | 6/2004 | Curtis |
| 2004/0173396 A1* | 9/2004 | Rush et al. .................. 180/165 |
| 2004/0188114 A1 | 9/2004 | Schlesser et al. |
| 2006/0137518 A1 | 6/2006 | Morency et al. |

FOREIGN PATENT DOCUMENTS

| | | |
|---|---|---|
| EP | 1288506 | 3/2003 |
| JP | 08080722 | 3/1996 |

* cited by examiner

SYSTEM FOR OPERATING A HYDRAULICALLY ACTUATED DEVICE

CROSS-REFERENCE TO RELATED APPLICATIONS

This application claims the benefit of U.S. Provisional Application No. 60/844,046, filed Sep. 12, 2006, the disclosure of which is incorporated herein by reference.

BACKGROUND OF THE INVENTION

This invention relates in general to systems for operating hydraulically actuated devices. In particular, this invention relates to an improved system for operating a hydraulically actuated device that is provided on a movable vehicle.

Trucks and other types of movable vehicles are often equipped with one or more hydraulically actuated devices for performing a variety of functions, such as snow plowing, earth moving, and the like. In vehicles that are so equipped, a source of pressurized fluid is typically provided on the vehicle to operate the hydraulically actuated device in a desired manner. The engine of the vehicle allows the vehicle to be moved as desired, while the source of pressurized fluid allows the hydraulically actuated device to be operated to perform the desired function. Ideally, the source of pressurized fluid allows the hydraulically actuated device to be operated independently of whether the vehicle is moving.

Known sources of pressurized fluid for vehicular-mounted hydraulically actuated devices have typically been provided having one of three general types of structures. In the first type of structure, the source of pressurized fluid is an electrically operated hydraulic pump that is electrically connected to the electrical system of the vehicle. Although such electrically operated hydraulic pumps are effective, they have been found to be relatively difficult to maintain and, in some situations, may require customization of the electrical system of the vehicle in order to safely allow the necessary amount of electrical power to operate the hydraulic pump to be drawn. In the second type of structure, the source of pressurized fluid is a mechanically operated clutch pump that is connected to the engine of the vehicle by means of an aftermarket serpentine belt. Although such mechanically operated clutch pumps are also effective, they have been found to be relatively difficult to maintain, involve the use of customized installation hardware, and can place an unduly large load on the engine of the vehicle.

In the third type of structure, the source of pressurized fluid is a mechanically operated hydraulic pump that is driven by a power take-off unit connected to the transmission of the vehicle. Such mechanically operated power take-off unit/hydraulic pump assemblies avoid many of the drawbacks mentioned above. However, it is increasing common for trucks and other relatively heavy duty vehicles to be provided with automatic transmissions. The use of these power take-off unit/hydraulic pump assemblies in vehicles having automatic transmissions is often undesirable because the amount of power that is available for use from the power take-off unit is limited or non-existent when the automatic transmission is in a moving gear ratio (i.e., forward or reverse), but the vehicle itself is stationary. Thus, it would be desirable to provide an improved system for operating a hydraulically actuated device that is provided on a vehicle that avoids this problem.

SUMMARY OF THE INVENTION

This invention relates to an improved system for operating a hydraulically actuated device that is provided on a vehicle. The system includes a power take-off unit that is adapted to be driven by a transmission of a vehicle and a hydraulic pump that is driven by the power take-off unit. The system also includes an accumulator and a hydraulically actuated device. Lastly, the system includes a controller that causes the hydraulic pump to supply pressurized fluid to the hydraulically actuated device when the vehicle is moving. When the vehicle is not moving, however, the controller causes the accumulator to supply pressurized fluid to the hydraulically actuated device.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
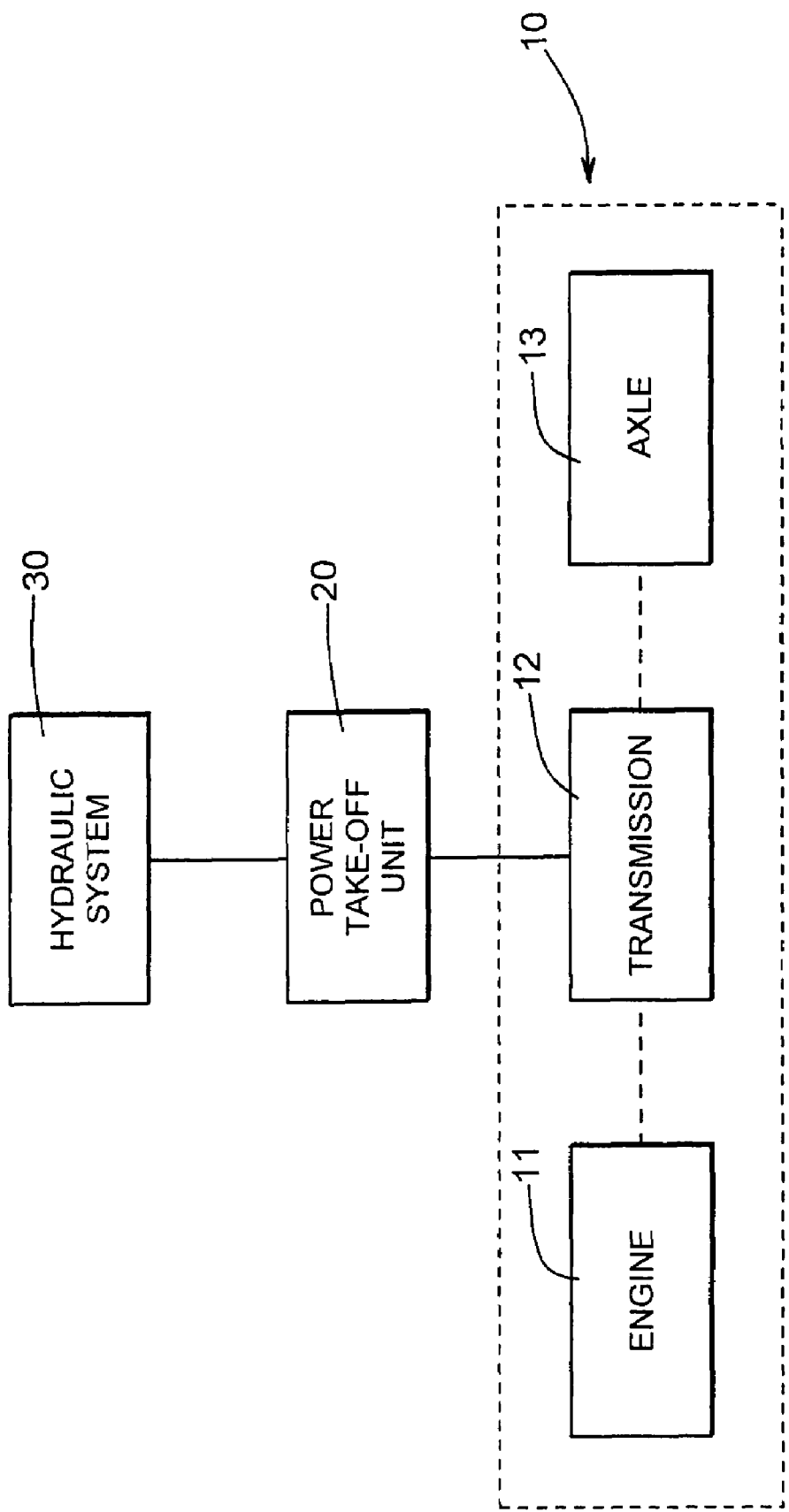
FIG. 1 is a schematic block diagram of a vehicular drive train assembly and a hydraulic system in accordance with this invention that cooperates with the vehicular drive train assembly.

Referring now to the drawings, there is illustrated in FIG. 1 a schematic block diagram of a drive train assembly, indicated generally at 10, for a truck or any other type of vehicle. The illustrated vehicle drive train assembly 10 is, in large measure, conventional in the art and is intended merely to illustrate one environment in which this invention may be used. Thus, the scope of this invention is not intended to be limited for use with the specific structure for the vehicle drive train assembly 10 illustrated in FIG. 1 or with vehicle drive train assemblies in general. On the contrary, as will become apparent below, this invention may be used in any desired environment for the purposes described below.

The illustrated vehicular drive train system 10 includes an engine 11, a transmission 12, and an axle assembly 13. The engine 11 is conventional in the art and may, for example, be embodied as an internal combustion or diesel engine. However, the engine 11 may be embodied as any desired structure that functions as a source of mechanical rotational power. The transmission 12 is also conventional in the art and may, for example, be embodied as an automatic, automated manual, or manual transmission. However, the transmission 12 may be embodied as any desired structure that functions to transfer the mechanical rotational power from the engine 11 to the axle assembly 13 at a variety of moving gear ratios (i.e., forward and reverse), thereby allowing changes of torque and speed, and non-moving gear ratios (i.e., park or neutral). Lastly, the axle assembly 13 is also conventional in the art and may, for example, be embodied as a differential mechanism. However, the axle assembly 13 may be embodied as any desired structure that transmits the mechanical rotational power from the transmission 12 to the wheels of the vehicle.

FIG. 1 also illustrates a power take-off unit 20 that is connected to the transmission 12 of the vehicular drive train assembly 10. The power take-off unit 20 is conventional in the art and may, for example, include a housing (not shown) that rotatably supports an input gear (which is rotatably driven by the transmission 12), an output shaft, and a set of meshing intermediate gears. The meshing intermediate gears are connected in a gear train between input gear and the output shaft so as to provide a rotatable driving connection therebetween. The set of gears permits one or more speed reduction gear ratios to be provided between the input gear and the output shaft. If desired, the power take-off unit 20 may include a clutch assembly for selectively disconnecting the output shaft from the input gear. However, the power take-off unit 20 may be embodied as any desired structure that is responsive to operation of the transmission 12 for causing rotation of the output shaft.

FIG. 1 further illustrates a hydraulic system 30 that cooperates with the power take-off unit 20 and the vehicular drive train system 10 in accordance with this invention. The structure of the hydraulic system 30 is illustrated in detail in FIG. 2. As shown therein, the hydraulic system 30 includes a hydraulic pump 31 that is connected to the power take-off unit 20 and is mechanically driven by the output shaft thereof. The hydraulic pump 31 is also conventional in the art and may, for example, include a housing (not shown) that supports a pumping mechanism. The housing of the hydraulic pump 31 may be supported directly on the housing of the power take-off unit 20 such that the output shaft of the power take-off unit 20 extends therein into cooperation with the pumping mechanism. However, the hydraulic pump 31 may be embodied as any desired structure that is responsive to rotation of the output shaft of the power take-off unit 20 for drawing hydraulic fluid from a reservoir 32 into an inlet port thereof and for generating a flow of hydraulic fluid through an output port thereof.

The output port of the hydraulic pump 31 is connected through a pump unloading valve 33 to the reservoir 32. The pump unloading valve 33 is conventional in the art and is operable in either an opened condition, wherein fluid communication from the hydraulic pump 31 to the reservoir 32 is permitted, and a closed condition, wherein fluid communication from the hydraulic pump 31 to the reservoir 32 is prevented. Preferably, the pump unloading valve 33 is a solenoid-operated fluid valve. However, the pump unloading valve 33 may be embodied as any desired fluid valve structure.

The output port of the hydraulic pump 31 is also connected through a pump actuating valve 34 to a hydraulically actuated device 35. The pump actuating valve 34 is also conventional in the art and is operable in either an opened condition, wherein fluid communication from the hydraulic pump 31 to the hydraulically actuated device 35 is permitted, and a closed condition, wherein fluid communication from the hydraulic pump 31 to the hydraulically actuated device 35 is prevented. Preferably, the pump actuating valve 34 is a solenoid-operated fluid valve. However, the pump actuating valve 34 may be embodied as any desired fluid valve structure.

The illustrated hydraulically actuated device 35 is intended to be representative of any mechanism or group of mechanisms that is responsive to the flow of hydraulic fluid from the output port of the hydraulic pump 31 for performing a function. For example, the hydraulically actuated device 35 may be a device that is responsive to the flow of hydraulic fluid from the hydraulic pump 31 for performing snow plowing, earth moving, or other functions. If desired, the hydraulically actuated device 35 can be a double-acting mechanism such as, for example, a hydraulically actuated linear actuator having a piston that can reciprocate in two directions relative to a cylinder. In such instances, a plurality of valves (not shown) may be provided for actuating the hydraulically actuated device 35, as is well known in the art. As will be explained in detail below, during normal operation of the vehicular drive train system 10, the power take-off unit 20 drives the hydraulic pump 31 to generate a flow of pressurized hydraulic fluid to the hydraulically actuated device 35, causing same to be operated. The hydraulic fluid then flows from the hydraulically actuated device 35 back to the reservoir 32, where it can be drawn into the input port of the hydraulic pump 31 as described above to complete a hydraulic circuit.

The output port of the hydraulic pump 31 is further connected through an accumulator charge valve 36 to a hydraulic accumulator 37. The accumulator charge valve 36 is conventional in the art and is operable in either an opened condition, wherein fluid communication from the hydraulic pump 31 to the accumulator 37 is permitted, and a closed condition, wherein fluid communication from the hydraulic pump 31 to the accumulator 37 is prevented. Preferably, the accumulator charge valve 36 is a solenoid-operated fluid valve. However, the accumulator charge valve 36 may be embodied as any desired fluid valve structure.

The accumulator 37 is conventional in the art and is adapted to store fluid under pressure. To accomplish this, the accumulator 37 may be a vessel in which a quantity of essentially non-compressible hydraulic fluid is held under pressure by an external source, such as a spring or a compressed gas. However, the accumulator 37 may be embodied as any desired structure for storing a quantity of pressurized hydraulic fluid from the hydraulic pump 31. The purpose for the accumulator 37 will be explained in detail below.

The accumulator 37 is connected through an accumulator discharge valve 38 to the hydraulically actuated device 35. The accumulator discharge valve 38 is conventional in the art and is operable in either an opened condition, wherein fluid communication from the accumulator 37 to the hydraulically actuated device 35 is permitted, and a closed condition, wherein fluid communication from the accumulator 37 to the hydraulically actuated device 35 is prevented. Preferably, the accumulator discharge valve 38 is a solenoid-operated fluid valve. However, the accumulator discharge valve 38 may be embodied as any desired fluid valve structure.

As mentioned above, the pump unloading valve 33, the pump actuating valve 34, the accumulator charge valve 36, and the accumulator discharge valve 38 are each preferably embodied as solenoid-operated fluid valves. If desired, the pump unloading valve 33, the pump actuating valve 34, the accumulator charge valve 36, and the accumulator discharge valve 38 can all be provided within a single valve manifold block (not shown), the structure of which is conventional in the art.

Finally, the hydraulic system 30 includes a controller 39 that controls the operations of the pump unloading valve 33, the pump actuating valve 34, the accumulator charge valve 36, and the accumulator discharge valve 38. The controller 39 is conventional in the art and may, for example, be embodied as any electronic control circuit, such as a microprocessor or a programmable controller. As will be explained in greater detail below, the controller 39 controls the operations of the pump unloading valve 33, the pump actuating valve 34, the accumulator charge valve 36, and the accumulator discharge valve 38 to operate the hydraulic system 30 in accordance with this invention.

Figure 2:
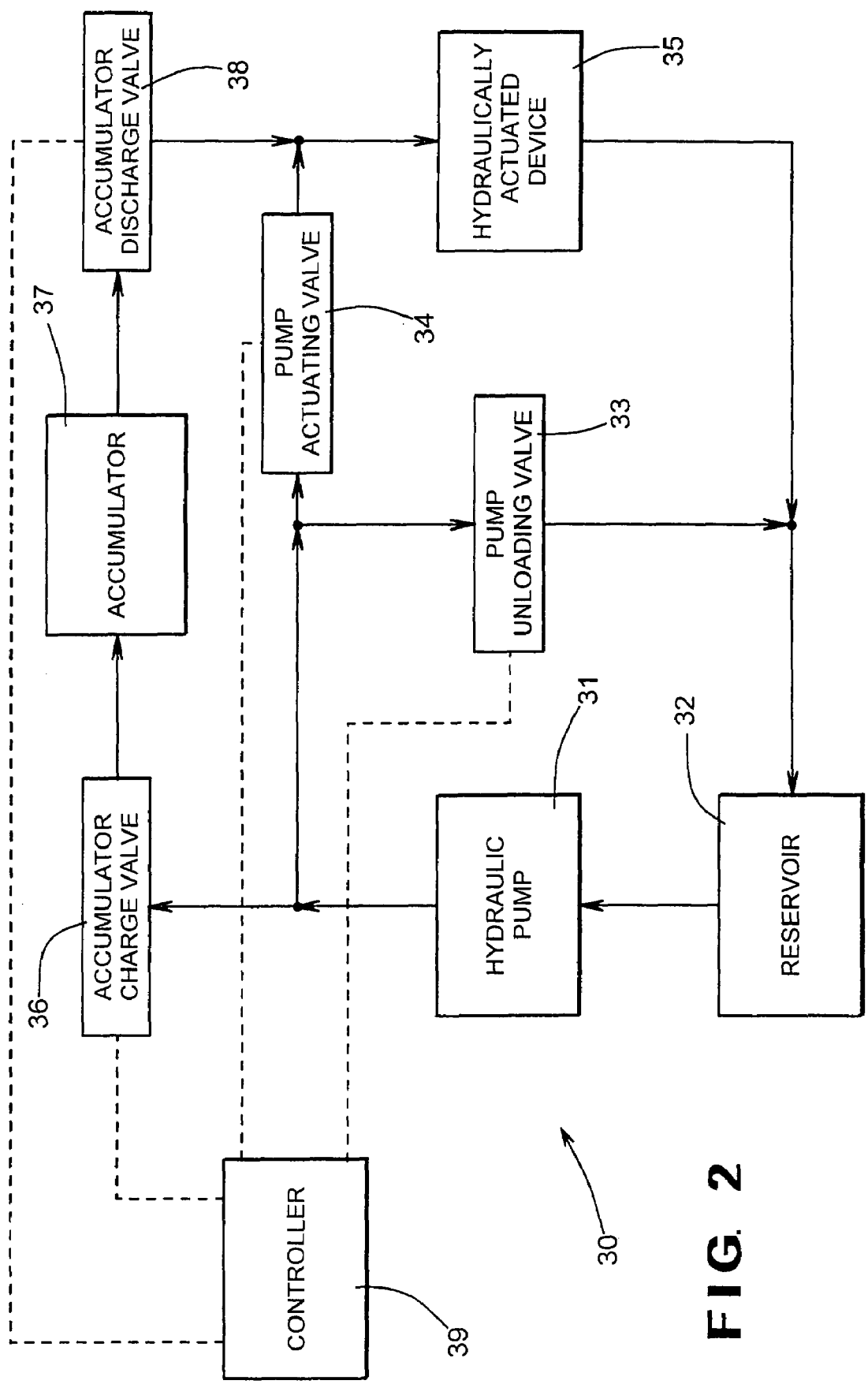
FIG. 2 is a more detailed block diagram of the structure of the hydraulic system illustrated in FIG. 1.
Figure 3:
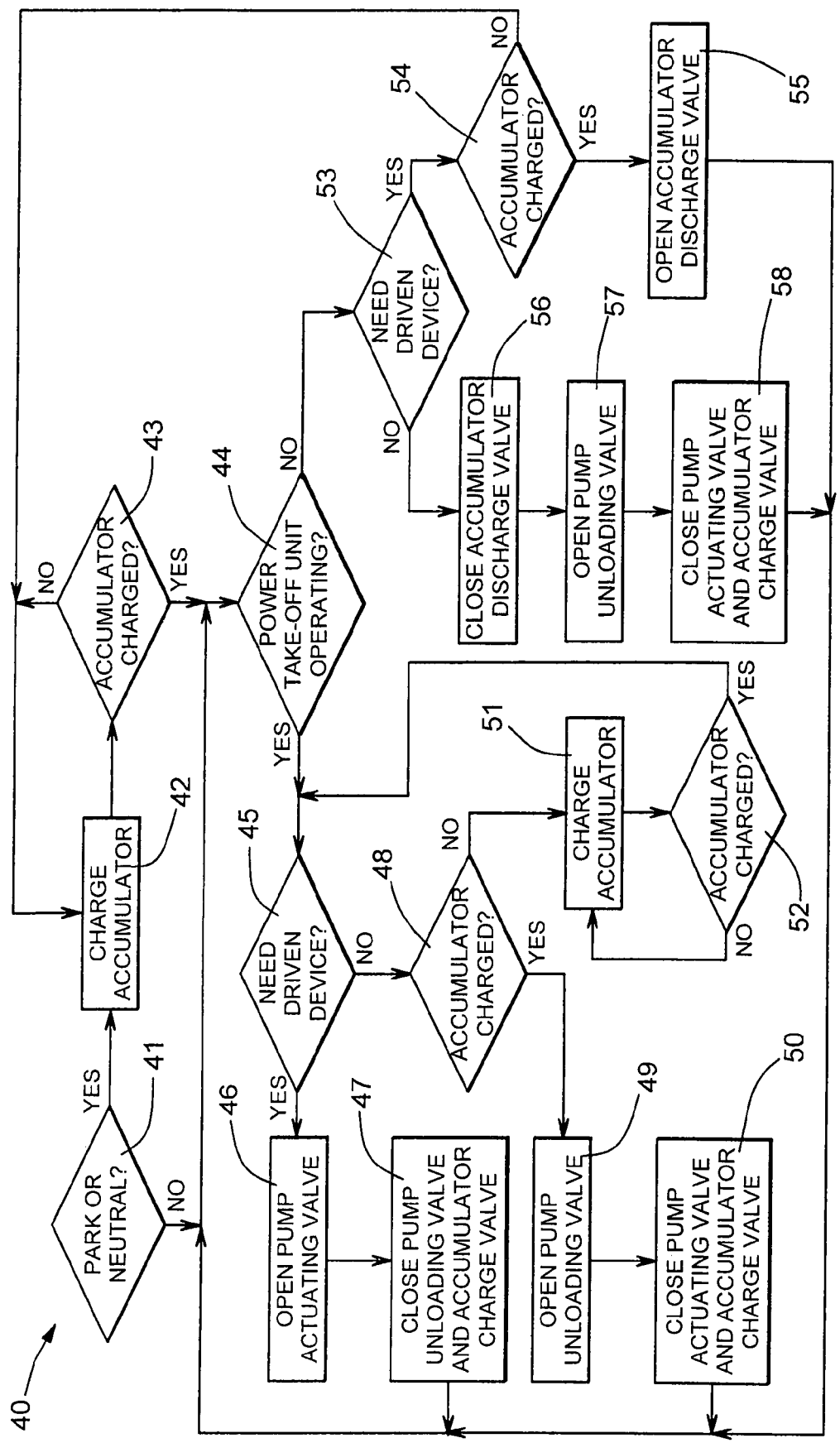
FIG. 3 is a flowchart that shows the operation of the hydraulic system illustrated in FIGS. 1 and 2.

FIG. 3 is a flowchart of a method, indicated generally at 40, by which the controller 39 controls the operation of the hydraulic system 30 illustrated in FIGS. 1 and 2 in accordance with this invention. In an initial decision point 41 of this method 40, a determination is whether the transmission 12 of the drive train assembly 10 is in a non-moving gear ratio (i.e., park or neutral). This determination can be made in any conventional manner, such as by providing the transmission 12 with a conventional gear ratio sensor (not shown) that generates a signal that is representative of the gear ratio of the transmission 12. If the transmission 12 is in a non-moving gear ratio, then the method 40 branches to an instruction 42, wherein the controller 39 is actuated to charge the accumulator 37 with pressurized fluid from the hydraulic pump 31. This can be accomplished by causing the controller 39 to generate appropriate signals to close the pump unloading valve 33, close the pump actuating valve 34, open the accumulator charge valve 36, and close the accumulator discharge valve 38. Then, when the vehicular drive train system 10 is operated, the engagement of the power take-off unit 20 with the transmission 12 will cause the hydraulic pump 31 to be operated. As a result, pressurized hydraulic fluid flows from the hydraulic pump 31 through the accumulator charge valve 36 into the accumulator 37.

The method 40 then enters a decision point 43, wherein it is determined whether the pressure of the hydraulic fluid in the accumulator 37 has been raised to a predetermined desired level. This determination can be made in any conventional manner, such as by providing the accumulator 37 with a conventional pressure sensor (not shown) that generates a signal that is representative of the pressure of the hydraulic fluid within the accumulator 37. The controller 39 can compare this pressure sensor signal with a predetermined threshold signal to make this determination. If the pressure of the hydraulic fluid in the accumulator 37 has not reached the predetermined desired level, the method 40 branches from the decision point 43 back to the instruction 42, wherein the accumulator 37 continues to receive pressurized fluid from the hydraulic pump 31.

When the pressure of the hydraulic fluid in the accumulator 37 reaches the predetermined desired level, the method 40 branches from the decision point 43 to a decision point 44, wherein it is determined whether the power take-off unit 20 is being operated by the transmission 12 of the vehicular drive train system 10. As discussed above, it is increasing common for trucks and other relatively heavy duty vehicles to be provided with automatic transmissions. In these instances, when the automatic transmission is in a moving gear ratio (i.e., forward or reverse), but the vehicle itself is stationary, the automatic transmission does not operate the power take-off unit 20. This determination can be made in any conventional manner, such as by providing the vehicle with a conventional shaft sensor (not shown) that generates a signal that is representative of the rotational of a shaft contained within the power take-off unit 20, such as the input shaft or the output shaft. The controller 39 can compare this shaft sensor signal with a predetermined threshold signal to make this determination. Referring back to the initial decision point 41 mentioned above, if it is determined that the transmission 12 is not in a non-moving gear ratio (i.e., is in forward or reverse), then the method 40 branches directly to the decision point 44.

If it is determined in the decision point 44 that the power take-off unit 20 is being operated, then the method 40 branches from the decision point 44 to a decision point 45, wherein it is determined whether it is desired to operate the hydraulically actuated device 35. This determination can be made in any conventional manner, such as by providing an electrical switch (not shown) that is manually operable by an operator of the vehicle and is connected to the controller 39. The electrical switch can, for example, be a conventional normally open switch that is manually closed by the operator when it is desired to operate the hydraulically actuated device 35. Regardless of the specific structure of the electrical switch, if it is determined in the decision point 45 that it is desired to operate the hydraulically actuated device 35, the method 40 branches to an instruction 46, wherein the controller 39 opens the pump actuating valve 34. As described above, when the pump actuating valve 34 is in the opened condition, fluid communication from the hydraulic pump 31 to the hydraulically actuated device 35 is permitted. Then, the method 40 enters an instruction 47, wherein the controller 39 closes the pump unloading valve 33 and the accumulator charge valve 36. As also described above, when the pump unloading valve 33 is in the closed condition, fluid communication from the hydraulic pump 31 to the reservoir 32 is prevented. Similarly, when the accumulator charge valve 36 is in the closed condition, fluid communication from the hydraulic pump 31 to the accumulator 37 is prevented. Consequently, pressurized fluid is fed from the hydraulic pump 31 to the hydraulically actuated device 35 to operate same. After the hydraulically actuated device 35 has been operated in this manner, the method 40 then returns to the decision point 44, wherein it is again determined whether the power take-off unit 20 is being operated. The method 40 continues to operate the hydraulically actuated device 35 in this manner so long as the vehicle continues to move and the need for the operation of the hydraulically actuated device 35 (as indicated by the condition of the electrical switch) continues to be present.

If the method 40 reaches the decision point 45 and it is determined that it is no longer desired to operate the hydraulically actuated device 35 (such as when it is determined that the electrical switch is opened), then the method 40 branches from the decision point 45 to a decision point 48, wherein it is again determined whether the pressure of the hydraulic fluid in the accumulator 37 is at the predetermined desired level. This determination can be made in the same manner as described above. If the pressure of the hydraulic fluid in the accumulator 37 is at the predetermined desired level, the method 40 branches from the decision point 48 to an instruction 49, wherein the controller 39 opens the pump unloading valve 33. As also described above, when the pump unloading valve 33 is in the opened condition, fluid communication from the hydraulic pump 31 to the reservoir 32 is permitted. Then, the method 40 enters an instruction 50, wherein the controller 39 closes the pump actuating valve 34 and the accumulator charge valve 36. As described above, when the pump actuating valve 34 is in the closed condition, fluid communication from the hydraulic pump 31 to the hydraulically actuated device 35 is prevented. Similarly, when the accumulator charge valve 36 is in the closed condition, fluid communication from the hydraulic pump 31 to the accumulator 37 is prevented. Consequently, pressurized fluid is fed from the hydraulic pump 31 directly back to the reservoir 32, thereby preventing the hydraulically actuated device 35 from being operated. After the hydraulically actuated device 35 has been disabled in this manner, the method 40 then returns to the decision point 44, wherein it is again determined whether the power take-off unit 20 is being operated.

If the method 40 reaches the decision point 48 and it is determined that the pressure of the hydraulic fluid in the accumulator 37 is not at the predetermined desired level, the method 40 branches from the decision point 48 to an instruction 51, wherein the controller 39 is again actuated to charge the accumulator 37 with pressurized fluid from the hydraulic pump 31. This can be accomplished in the same manner as described above. The method 40 then enters a decision point 52, wherein it is again determined whether the pressure of the hydraulic fluid in the accumulator 37 has been raised to a predetermined desired level. As before, if the pressure of the hydraulic fluid in the accumulator 37 is not at the predetermined desired level, the method 40 branches from the decision point 52 back to the instruction 51, wherein the accumulator 37 continues to receive pressurized fluid from the hydraulic pump 31. However, if the pressure of the hydraulic fluid in the accumulator 37 is at the predetermined desired level, the method 40 branches from the decision point 52 back to the decision point 45, wherein it is determined whether it is desired to operate the hydraulically actuated device 35.

The method 40 continues in the manner described above until it is determined in the decision point 44 that the power take-off unit 20 is no longer being operated. If it determined that the vehicle is not moving, then the method 40 branches from the decision point 44 to a decision point 53, wherein it is again determined whether it is desired to operate the hydraulically actuated device 35. This determination can be made in the same manner as described above. If it is determined in the decision point 53 that it is desired to operate the hydraulically actuated device 35, the method 40 branches to a decision point 54, wherein it is again determined whether the pressure of the hydraulic fluid in the accumulator 37 is at the predetermined desired level. This determination can be made in the same manner as described above. If the pressure of the hydraulic fluid in the accumulator 37 is at the predetermined desired level, the method 40 branches from the decision point 54 to an instruction 55, wherein the controller 39 opens the accumulator discharge valve 38. As described above, when the accumulator discharge valve 38 is in the opened condition, fluid communication from the accumulator 37 to the hydraulically actuated device 35 is permitted. Consequently, pressurized fluid is fed from the accumulator 37 to the hydraulically actuated device 35 to operate same. After the hydraulically actuated device 35 has been operated in this manner, the method 40 then returns to the decision point 44, wherein it is again determined whether the power take-off unit 20 is being operated. The method 40 continues to operate the hydraulically actuated device 35 in this manner so long as the vehicle is not moving, the need for the operation of the hydraulically actuated device 35 (as indicated by the condition of the electrical switch) continues to be present, and the accumulator 37 is sufficiently charged with fluid pressure.

If, however, it is determined at the decision point 54 that the pressure of the hydraulic fluid in the accumulator 37 is not at the predetermined desired level, then the method 40 branches back to the instruction 42, wherein the controller 39 is actuated to charge the accumulator 37 with pressurized fluid from the hydraulic pump 31.

If the method 40 reaches the decision point 53 and it is determined that it is no longer desired to operate the hydraulically actuated device 35 (such as when it is determined that the electrical switch is opened), then the method 40 branches from the decision point 53 to an instruction 56, wherein the controller 30 closes the accumulator discharge valve 38. As described above, when the accumulator discharge valve 38 is in the closed condition, fluid communication from the accumulator 37 to the hydraulically actuated device 35 is prevented. Consequently, no pressurized fluid is fed from the accumulator 37 to the hydraulically actuated device 35, thereby preventing the hydraulically actuated device 35 from being operated. After the hydraulically actuated device 35 has been disabled in this manner, the method 40 then enters an instruction 57, wherein the controller 39 opens the pump unloading valve 33. As also described above, when the pump unloading valve 33 is in the opened condition, fluid communication from the hydraulic pump 31 to the reservoir 32 is permitted. Then, the method 40 enters an instruction 58, wherein the controller 39 closes the pump actuating valve 34 and the accumulator charge valve 36. As described above, when the pump actuating valve 34 is in the closed condition, fluid communication from the hydraulic pump 31 to the hydraulically actuated device 35 is prevented. Similarly, when the accumulator charge valve 36 is in the closed condition, fluid communication from the hydraulic pump 31 to the accumulator 37 is prevented. Consequently, pressurized fluid is fed from the hydraulic pump 31 directly back to the reservoir 32, thereby preventing the hydraulically actuated device 35 from being operated. After the hydraulically actuated device 35 has been disabled in this manner, the method 40 then returns to the decision point 44, wherein it is again determined whether the power take-off unit 20 is being operated.

Thus, when the vehicle is moving, pressurized fluid from the hydraulic pump 31 is either (1) fed to the hydraulically actuated device 35 to operate same when requested to do so by the operator, (2) fed to the accumulator 37 to charge same when operation of the hydraulically actuated device 35 has not been requested, or (3) returned to the reservoir 32 when operation of the hydraulically actuated device 35 has not been requested and the accumulator 37 has been fully charged. On the other hand, when the vehicle is not moving, pressurized fluid is fed from the accumulator 37 to the hydraulically actuated device 35 to operate same when requested to do so by the operator. However, whenever the vehicle is not moving and operation of the hydraulically actuated device 35 has not been requested by the operator, any pressurized fluid that is generated from the hydraulic pump 31 is returned to the reservoir 32.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system comprising:
    a power take-off unit that is adapted to be driven by a vehicle;
    a hydraulic pump that is driven by the power take-off unit;
    an accumulator;
    a hydraulically actuated device; and
    a controller that causes the hydraulic pump to supply pressurized fluid to the hydraulically actuated device when the vehicle is moving and causes the accumulator to supply pressurized fluid to the hydraulically actuated device when the vehicle is not moving.

2. The system defined in claim 1 wherein when the vehicle is moving, the controller causes the hydraulic pump to supply pressurized fluid to either (1) the hydraulically actuated device when requested or (2) the accumulator to charge the accumulator when operation of the hydraulically actuated device has not been requested.

3. The system defined in claim 1 wherein when the vehicle is moving, the controller causes the hydraulic pump to supply pressurized fluid to either (1) the hydraulically actuated device when requested, (2) the accumulator to charge the accumulator when operation of the hydraulically actuated device has not been requested, or (3) a reservoir when operation of the hydraulically actuated device has not been requested and the accumulator has been fully charged.

4. The system defined in claim 1 wherein when the vehicle is not moving, the controller causes the accumulator to supply pressurized fluid to the hydraulically actuated device when requested.

5. The system defined in claim 1 wherein when the vehicle is not moving, the controller causes the accumulator to supply pressurized fluid to the hydraulically actuated device when requested and causes the hydraulic pump to supply pressurized fluid to a reservoir when operation of the hydraulically actuated device has not been requested.

6. The system defined in claim 1 wherein (a) when the vehicle is moving, the controller causes the hydraulic pump to supply pressurized fluid to either (1) the hydraulically actuated device when requested or (2) the accumulator to charge the accumulator when operation of the hydraulically actuated device has not been requested, and (b) when the vehicle is not moving, the controller causes the accumulator to supply pressurized fluid to the hydraulically actuated device when requested.

7. The system defined in claim 1 wherein (a) when the vehicle is moving, the controller causes the hydraulic pump to supply pressurized fluid to either (1)the hydraulically actuated device when requested, (2) the accumulator to charge the accumulator when operation of the hydraulically actuated device has not been requested, or (3) a reservoir when operation of the hydraulically actuated device has not been requested and the accumulator has been fully charged, and (b) when the vehicle is not moving, the controller causes the accumulator to supply pressurized fluid to the hydraulically actuated device when requested and causes the hydraulic pump to supply pressurized fluid to a reservoir when operation of the hydraulically actuated device has not been requested.

8. A combined drive train assembly for a vehicle and system comprising:
 a drive train assembly for a vehicle including an engine, a transmission, and an axle assembly;
 a power take-off unit that is driven by the transmission;
 a hydraulic pump that is driven by the power take-off unit;
 an accumulator;
 a hydraulically actuated device; and
 a controller that causes the hydraulic pump to supply pressurized fluid to the hydraulically actuated device when the vehicle is moving and causes the accumulator to supply pressurized fluid to the hydraulically actuated device when the vehicle is not moving.

9. The system defined in claim 8 wherein when the vehicle is moving, the controller causes the hydraulic pump to supply pressurized fluid to either (1) the hydraulically actuated device when requested or (2) the accumulator to charge the accumulator when operation of the hydraulically actuated device has not been requested.

10. The system defined in claim 8 wherein when the vehicle is moving, the controller causes the hydraulic pump to supply pressurized fluid to either (1) the hydraulically actuated device when requested, (2) the accumulator to charge the accumulator when operation of the hydraulically actuated device has not been requested, or (3) a reservoir when operation of the hydraulically actuated device has not been requested and the accumulator has been fully charged.

11. The system defined in claim 8 wherein when the vehicle is not moving, the controller causes the accumulator to supply pressurized fluid to the hydraulically actuated device when requested.

12. The system defined in claim 8 wherein when the vehicle is not moving, the controller causes the accumulator to supply pressurized fluid to the hydraulically actuated device when requested and causes the hydraulic pump to supply pressurized fluid to a reservoir when operation of the hydraulically actuated device has not been requested.

13. The system defined in claim 8 wherein (a) when the vehicle is moving, the controller causes the hydraulic pump to supply pressurized fluid to either (1) the hydraulically actuated device when requested or (2) the accumulator to charge the accumulator when operation of the hydraulically actuated device has not been requested, and (b) when the vehicle is not moving, the controller causes the accumulator to supply pressurized fluid to the hydraulically actuated device when requested.

14. The system defined in claim 8 wherein (a) when the vehicle is moving, the controller causes the hydraulic pump to supply pressurized fluid to either (1) the hydraulically actuated device when requested, (2) the accumulator to charge the accumulator when operation of the hydraulically actuated device has not been requested, or (3) a reservoir when operation of the hydraulically actuated device has not been requested and the accumulator has been fully charged, and (b) when the vehicle is not moving, the controller causes the accumulator to supply pressurized fluid to the hydraulically actuated device when requested and causes the hydraulic pump to supply pressurized fluid to a reservoir when operation of the hydraulically actuated device has not been requested.

* * * * *